(12) United States Patent
Phelan et al.

(10) Patent No.: US 7,991,688 B2
(45) Date of Patent: Aug. 2, 2011

(54) METHODS AND APPARATUS FOR AUTOMATICALLY EXCHANGING CREDIT INFORMATION

(75) Inventors: William Phelan, Glenview, IL (US); Dan Michalek, Glenview, IL (US)

(73) Assignee: Knowledge Works Inc., Skokie, IL (US)

( * ) Notice: Subject to any disclaimer, the term of this patent is extended or adjusted under 35 U.S.C. 154(b) by 2013 days.

(21) Appl. No.: 09/993,992

(22) Filed: Nov. 14, 2001

(65) Prior Publication Data

US 2002/0072927 A1    Jun. 13, 2002

Related U.S. Application Data

(60) Provisional application No. 60/248,290, filed on Nov. 14, 2000.

(51) Int. Cl.
*G06Q 40/00* (2006.01)

(52) U.S. Cl. ............................................. 705/38; 705/35

(58) Field of Classification Search ................ 705/1, 36, 705/37, 38, 4, 51, 35, 67; 707/10
See application file for complete search history.

(56) References Cited

U.S. PATENT DOCUMENTS

| | | | | |
|---|---|---|---|---|
| 4,914,587 | A | | 4/1990 | Clouse .......................... 364/408 |
| 5,274,547 | A | * | 12/1993 | Zoffel et al. ..................... 705/38 |
| 5,708,828 | A | * | 1/1998 | Coleman ........................ 715/205 |
| 5,732,400 | A | | 3/1998 | Mandler et al. ................. 705/26 |
| 5,774,882 | A | | 6/1998 | Keen et al. ...................... 705/38 |
| 5,797,133 | A | | 8/1998 | Jones et al. ..................... 705/38 |
| 5,802,499 | A | * | 9/1998 | Sampson et al. ................ 705/35 |
| 5,878,403 | A | * | 3/1999 | DeFrancesco et al. ......... 705/38 |
| 5,903,881 | A | * | 5/1999 | Schrader et al. ................ 705/42 |
| 5,991,411 | A | * | 11/1999 | Kaufman et al. ............... 705/67 |
| 6,049,784 | A | | 4/2000 | Weatherly et al. .............. 705/38 |
| 6,073,117 | A | | 6/2000 | Oyanagi et al. ................. 705/38 |
| 6,081,789 | A | | 6/2000 | Purcell ............................ 705/37 |

(Continued)

FOREIGN PATENT DOCUMENTS

WO        WO 0011586 A   *   3/2000
WO        WO 0011586 A1  *   3/2000

OTHER PUBLICATIONS

Mullins, Craig. Data warehousing guidelines for DB2; includes related article on data mining investments; Technology Information. Aug. 1998. Enterprise Systems Journal. p. 1-6.*

(Continued)

*Primary Examiner* — Susanna M Diaz
*Assistant Examiner* — Jamie H Swartz
(74) *Attorney, Agent, or Firm* — Marshall, Gerstein & Borun LLP

(57) ABSTRACT

Methods and apparatus for pooling credit and business information are disclosed. A disclosed apparatus includes an input and a data processing facility structured to process credit information received at the input from one of a plurality of unrelated users. The apparatus also includes a data storage device structured to store the processed credit information received from the plurality of unrelated users and a search engine responsive to a request from a requestor for credit information to search the data storage device for responsive credit information. The apparatus further includes an output for outputting the responsive credit information to the requester. The apparatus may also include an accounting facility cooperating with the search engine to charge a search fee to the requester of the responsive credit information without disclosing lender identification information associated with the credit information.

5 Claims, 20 Drawing Sheets

U.S. PATENT DOCUMENTS

| | | | | |
|---|---|---|---|---|
| 6,088,677 | A | | 7/2000 | Spurgeon .......................... 705/4 |
| 6,112,190 | A | * | 8/2000 | Fletcher et al. ............. 705/36 R |
| 6,119,103 | A | * | 9/2000 | Basch et al. .................... 705/35 |
| 6,202,053 | B1 | * | 3/2001 | Christiansen et al. .......... 705/38 |
| 6,795,819 | B2 | * | 9/2004 | Wheeler et al. .................... 707/3 |
| 2001/0011245 | A1 | * | 8/2001 | Duhon ............................ 705/38 |
| 2002/0072927 | A1 | * | 6/2002 | Phelan et al. ..................... 705/1 |
| 2004/0088239 | A1 | * | 5/2004 | Eder ............................... 705/36 |
| 2005/0159996 | A1 | * | 7/2005 | Lazarus et al. .................. 705/10 |

OTHER PUBLICATIONS

Peters, Pamela. Automaed credit reporting: an idea whose time has come. Journal of Commercial Lending. Aug. 1, 1995. p. 1-7.*

Inso Corporation. Inso Demonstrates the First End-to-End XML Publishing Solution; Announces New DynaTag Data Rescue Module for Converting Proprietary Formats to XML; 'Dyna' Products Create, Convert, Store, Manage, Index, Search, and Publish XML Content to the Web, CD-ROM, and Print. Dec. 9, 1997. PR Newswire. p. 1-4.*

* cited by examiner

KW.PAYNET.MENU

00/00/01
00:00:00

1. CONTROL MAINTENANCE
2. LEASE TRANSFER
3. LEASE RE-TRANSFER
4. LEASE TRANSFER STATUS INQUIRY
5. REMOVE PRIOR TRANSFER FILES
6. COPY TO ANOTHER ACCOUNT

FIG. 8

KW.PAYNET.MAINT                PayNet Transfer Control Maintenance

Control ID (PAYNET)                                                     Last Transfer Date :   00/00/01
                                                                              Start Time :   00:00:00

1.  Member Identifier              : 99999999                                                00-00-01
2.  Portfolio Identifier           : 99999999                                 End Time   :   00:00:00
3.  Member Load Password           : test_pwd                                                00:00:00
4.  Log E-mail Address             :
5.  Transfer Type (B, E, II)       : H
6.  Destination E-mail Address     : log@kworksonline.com
7.  Internet Transfer Name/IP Address : 64.59.6.78
8.  Internet Transfer Login ID     : httpslogin
9.  Internet Transfer Login Password : httpspasswd
10. Test Mode (Y/N)                : N
11. Maintain History (Y/N)         : N
    Transfer Run Default
12. (S)leep, (I)mmediate           : I
13. Sleep Until hh:mm:ss           : 23:00:00
14. Compress Transfer File         : Y
15. Prompts in Transfer Pgm        : Y Enter:  (#; S=Save; F=End)

FIG. 9

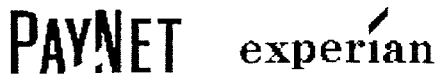

COMPREHENSIVE BUSINESS REPORT

Report Details

| Report ID | Generation Date and Time |
|---|---|
| 632 | 9/17/2001 11:47:23 AM |

Business Background Information

| | |
|---|---|
| PayNet ID | 2555882 |
| Company Name | JONES CONSTRUCTION |
| Tax ID | 041215610 |
| Address | 1525 W 180TH ST MIDDLEBORO, MA 02349 |
| Telephone | (555)555-5234 |
| Fax | (555)555-0223 |
| Years in Business | 10 |
| Sales | $12,000,000 |
| # of Employees | 45 |

Corporate Registration

| | |
|---|---|
| Reporting State | MS |
| Incorporation Date | 1992 |
| Business Type | INCORPORATED |
| Status | GOOD-STANDING |
| Agent | BOB SMITH 1510 N WINCHESTER VICKSBURG, MS 39180 |

SIC Codes

| Number | Description |
|---|---|
| 1022 | CONSTRUCTION EQUIPMENT |

PAYNET Lease & Loan Inquiries

| AUG | JUL | JUN | MAY | APR | MAR |
|---|---|---|---|---|---|
| 1 | | | 3 | | |

Management

| Name | Title |
|---|---|
| BRAD JONES | PRESIDENT |

PAYNET Lease & Loan Payment Summary

| PAYNET Index | # Open Contracts | # Closed Contracts | Gross Original Receivable | Gross Outstanding Balance | Outstanding Monthly Payments | Outstanding Past Due Amount | Past Due Occurrences 31-60 | 61-90 | 91+ |
|---|---|---|---|---|---|---|---|---|---|
| 100 | 7 | 1 | $92,131 | $55,516 | $1,350 | $0 | 0 | 0 | 0 |

PAYNET Lease & Loan Payment Detail - Open Contracts

| | Equip | Guar | Start Date (m/y) | Term (mo) | Payment Amount | Pymt Freq | As of (m/y) | Original Receivable | Outstanding Balance | Currently Past Due $ 31-60 | 61-90 | 91+ | Losses |
|---|---|---|---|---|---|---|---|---|---|---|---|---|---|
| Member Company 1 | | | | | | | | | | | | | |
| 1 | UNKN | YES | 3/01 | 60 | $700 | MO | 8/01 | $41,991 | $39,192 | $0 | $0 | $0 | $0 |
| 2 | UNKN | YES | 6/00 | 60 | $131 | MO | 8/01 | $7,840 | $5,880 | $0 | $0 | $0 | $0 |
| 3 | UNKN | YES | 7/99 | 60 | $90 | MO | 8/01 | $5,400 | $3,150 | $0 | $0 | $0 | $0 |
| 4 | UNKN | YES | 2/99 | 60 | $90 | MO | 8/01 | $5,380 | $2,690 | $0 | $0 | $0 | $0 |
| 5 | UNKN | YES | 7/98 | 60 | $73 | MO | 8/01 | $4,379 | $1,533 | $0 | $0 | $0 | $0 |
| 6 | UNKN | YES | 1/98 | 60 | $134 | MO | 8/01 | $8,013 | $2,003 | $0 | $0 | $0 | $0 |

FIG. 15A

PAYNET Lease & Loan Payment Detail - Open Contracts (continued)

| | Equip | Guar | Start Date (m/y) | Term (mo) | Payment Amount | Pymt Freq | As of (m/y) | Original Receivable | Outstanding Balance | Currently Past Due $ | | | Losses |
|---|---|---|---|---|---|---|---|---|---|---|---|---|---|
| | | | | | | | | | | 31-60 | 61-90 | 91+ | |
| 7 | UNKN | YES | 6/97 | 60 | $134 | MO | 8/01 | $8,013 | $1,068 | $0 | $0 | $0 | $0 |
| | | | | | | | Totals: | $81,016 | $55,516 | $0 | $0 | $0 | $0 |

PAYNET Lease & Loan Payment Detail - Closed Contracts

| | Equip | Guar | Start Date (m/y) | Term (mo) | Payment Amount | Pymt Freq | Clsd (m/y) | Original Receivable | Outstanding Balance | Currently Past Due $ | | | Losses |
|---|---|---|---|---|---|---|---|---|---|---|---|---|---|
| | | | | | | | | | | 31-60 | 61-90 | 91+ | |

Member Company 1

| | Equip | Guar | Start | Term | Payment | Pymt | Clsd | Original | Outstanding | 31-60 | 61-90 | 91+ | Losses |
|---|---|---|---|---|---|---|---|---|---|---|---|---|---|
| 1 | UNKN | YES | 8/98 | 60 | $185 | MO | 7/00 | $11,115 | $0 | 0 | 0 | 0 | $0 |
| | | | | | | | Totals: | $11,115 | $0 | 0 | 0 | 0 | $0 |

PAYNET Lease & Loan Payment Detail - Trend Analysis - Open Contracts

Legend: A = On Time; B = 31-60 Days Late, C = 61-90 Days Late; D = 91+ Days Late; Blank = Not Available

| | 2001 | | | 2000 | | | | | | | | | | 1999 | | | | | | |
|---|---|---|---|---|---|---|---|---|---|---|---|---|---|---|---|---|---|---|---|---|
| | S | A | J | J | M | A | M | F | J | D | N | O | S | A | J | J | M | A | M | F | J | D | N | O |

Member Company 1

| 1 | | A | A | | | | | | | | | | | | | | | | | | | | | |
| 2 | | A | A | | | | | | | | | | | | | | | | | | | | | |
| 3 | | A | A | | | | | | | | | | | | | | | | | | | | | |
| 4 | | A | A | | | | | | | | | | | | | | | | | | | | | |
| 5 | | A | A | | | | | | | | | | | | | | | | | | | | | |
| 6 | | A | A | | | | | | | | | | | | | | | | | | | | | |
| 7 | | A | A | | | | | | | | | | | | | | | | | | | | | |

Experian Trade Payment Experiences

| Business Category | Date Repd | Last Sale | Payment Terms | Recent High Credit | Balance | Days Past Due | | | | | Comments |
|---|---|---|---|---|---|---|---|---|---|---|---|
| | | | | | | % Cur | 1-30 | 31-60 | 61-90 | 91+ | |
| AIR TRANS | 01-01 | 02-01 | NET 15 | $21,900 | $16,500 | 79% | 17% | 4% | | | |
| AIR TRANS | 01-01 | 01-01 | NET 30 | $0 | $0 | | | | | | |
| CELLUL/PAG | 02-01 | 02-01 | NET 30 | $2,100 | $1,200 | 100% | | | | | CUST 14 YR |
| BLDG MATRL | 01-01 | | VARIED | $2,100 | $1,200 | 100% | | | | | PROMPT |

FIG. 15B

Additional Experian Trade Payment Experiences

| Business Category | Date Rcpd | Last Sale | Payment Terms | Recent High Credit | Balance | % Cur | Days Past Due 1-30 | Days Past Due 31-60 | Days Past Due 61-90 | Days Past Due 91+ | Comments |
|---|---|---|---|---|---|---|---|---|---|---|---|
| AUTO LEASE | 09-00 | | VARIED | $28,300 | $15,700 | 100% | | | | | |
| CRED CARD | 12-00 | 12-00 | R01 | $600 | $200 | 98% | 2% | | | | 30 DYS SLO |

Experian Trade Inquiries

| AUG | JUL | JUN | MAY | APR | MAR |
|---|---|---|---|---|---|
| 1 | | | 3 | | |

Experian Trade Payment Totals

| | Recent High Credit | Balance | % Cur | Days Past Due 1-30 | Days Past Due 31-60 | Days Past Due 61-90 | Days Past Due 91+ | DBT |
|---|---|---|---|---|---|---|---|---|
| Continuously Reported (3): | $24,000 | $17,700 | 84% | 13% | 3% | | | 3 |
| Newly Reported (1): | $2,100 | $1,200 | 100% | | | | | 0 |
| Trade Line Totals (4): | $28,620 | $18,900 | 84% | 13% | 3% | | | 3 |

Experian Trade Payment Trends (based on continuously reported trade lines)

| As of | Industry % Current | Industry DBT | Borrower's DBT | Balance | % Current | Days Past Due 1-30 | Days Past Due 31-60 | Days Past Due 61-90 | Days Past Due 91+ |
|---|---|---|---|---|---|---|---|---|---|
| 7-27-01 | N/A | N/A | 47 | $24,700 | 42% | 13% | 4% | 1% | 40% |
| 07-01-01 | 66% | 13 | 60 | $32,200 | 33% | 10% | 3% | | 54% |
| 06-01-01 | 64% | 13 | 68 | $27,800 | 27% | 7% | 4% | | 62% |
| 05-01-01 | 60% | 14 | 68 | $37,600 | 24% | 6% | 6% | 11% | 53% |
| 04-01-01 | 63% | 12 | 57 | $43,600 | 36% | 5% | 5% | 9% | 45% |
| 03-01-01 | 62% | 12 | 49 | $52,000 | 40% | 10% | 4% | 8% | 38% |
| 02-01-01 | 61% | 12 | 44 | $64,500 | 30% | 19% | 17% | 6% | 28% |

Experian Trade Payment History - Quarterly Averages

| Quarter | DBT | Balance | % Current | Days Past Due 1-30 | Days Past Due 31-60 | Days Past Due 61-90 | Days Past Due 91+ |
|---|---|---|---|---|---|---|---|
| Q2 - 2001 | 54 | $24,800 | 35% | 10% | 6% | 6% | 43% |
| Q1 - 2001 | 49 | $53,400 | 35% | 12% | 10% | 4% | 30% |
| Q4 - 2000 | 40 | $53,500 | 38% | 23% | 5% | 4% | 30% |
| Q3 - 2000 | 40 | $50,500 | 37% | 26% | 4% | | 33% |
| Q2 - 2000 | 51 | $39,200 | 37% | 15% | 2% | 1% | 45% |

FIG. 15C

Banking Relationships

| | | | |
|---|---|---|---|
| Bank | COMMUNITY BANK & LOAN<br>3220 S. JACKSON, LEXINGTON, MS 39095<br>(555)920-5555 | | |
| Type of Institution | SAVINGS & LOAN | Relationship | PRIVATE LOAN |
| Rating | SATISFACTORY AS OF 08/01/2001 | Date Open | 09/20/1999 |
| Balance | MID FIVE FIGURES | Balance Amount | $50,000 |

| | | | |
|---|---|---|---|
| Bank | FIRST NATIONAL BANK<br>1234 16TH STREET, SAN FRANCISCO, CA<br>(415)555-1236 | | |
| Type of Institution | BANK | Relationship | BORROWER |
| Rating | NO COMMENT AS OF 08/01/2001 | Date Open | 08/20/1997 |
| Balance | HIGH SIX FIGURES | | |

Bankruptcies

| Document Number | Date Filed | Legal Type / Action | Filing Location | Owner | Liability | Assets | Exempt Amt |
|---|---|---|---|---|---|---|---|
| V03430592 | 01-10-01 | CHAPTER 11 | ST LOUIS COUNTY DIST CT | BRAD JONES | $15,000 | $30,000 | $10,000 |
| V79009879 | 01-31-01 | CHAPTER 11 | ST LOUIS COUNTY DIST CT | BRAD JONES | $10,000 | $25,000 | $5,600 |

Tax Liens

| Document Number | Liability | Reason / Description | Legal Action | Owner | Filing Location |
|---|---|---|---|---|---|
| T70202052 | $20,000 | SALES-TAX | RELEASED | BRAD JONES | WAUSAU CTY ASSN |
| T70202052 | $2,500 | SALES-TAX | LIEN | BRAD JONES | WAUSAU CTY ASSN |

Judgments

| Document Number | Date Filed | Award / Liability | Plaintiff | Legal Action | Owner | Filing Location |
|---|---|---|---|---|---|---|
| 0000000099008421 | 09-24-99 | $500 | CLIFFORD J RENKINS | FILED | BRAD JONES | COOK COUNTY DIST CT |
| 0000000012561044 | 07-01-98 | $640 | C & L JORDAN | SATISFIED | BRAD JONES | PRESCOTT JUS CT |

FIG. 15D

| UCC Profile | | | | | |
|---|---|---|---|---|---|
| Date Range | Cautionary UCCs * | Total Filed | Released / Terminated | Continued | Amended / Assigned |
| JAN TO PRESENT | 0 | 0 | 0 | 0 | 0 |
| JULY TO DEC 2000 | 2 | 3 | 0 | 0 | 0 |
| JAN TO JUN 2000 | 0 | 1 | 0 | 0 | 0 |
| JULY TO DEC 1999 | 0 | 1 | 0 | 0 | 0 |
| JAN TO JUN 1999 | 1 | 1 | 0 | 0 | 0 |
| PRIOR TO JAN 1999 | 1 | 7 | 0 | 1 | 5 |
| Totals: | 4 | 13 | 0 | 1 | 0 |

* These are Cautionary UCC Filings with one or more of the following collateral accounts, accounts receivable, contracts, hereafter acquired inventory, leases, notes receivable, proceeds

| | |
|---|---|
| UCC-Filed: | 11-29-00 0000634352, SEC OF STATE TEXAS |
| Secured Party: | U S BANCORP OLIVER ALLEN TECHNOLOGY LEASING CA LARKSPUR 949 |
| Collateral: | EQUIP, HEREAFTER ACQUIRED PROP, UNDEFINED |

| | |
|---|---|
| UCC-Filed: | 10-10-00 20002956051, SEC OF STATE CALIFOR |
| Secured Party: | U.S. BANCORP OLIVER ALLEN TECHNOLOGY LEASING CA LARKSPUR 949 |
| Collateral: | EQUIP, HEREAFTER ACQUIRED PROP, UNDEFINED |

The information presented here is confidential and is supplied according to the terms and conditions of the PAYNET Member Agreement. This report is to be used for legitimate business purposes only and shall not be reproduced PAYNET, Inc., their affiliates and sources do not warrant such information and shall not be held liable for your use or reliance upon it

FIG. 15E

METHODS AND APPARATUS FOR AUTOMATICALLY EXCHANGING CREDIT INFORMATION

RELATED APPLICATION

This application claims priority under 35 U.S.C. §119(e) from Provisional Application Ser. No. 60/248,290, filed Nov. 14, 2000.

FIELD OF THE INVENTION

The invention relates generally to credit information, and, more particularly, to methods and apparatus for developing and selling commercial lending information.

BACKGROUND OF THE INVENTION

Today, credit bureau reports do not include information about an entity's loan and/or lease obligations and payment history. Loans and/or leases of interest can be, for example, real property loans and/or leases and/or personal property loans and/or leases. While commercial lending companies can currently determine the number of loans and/or leases a customer has with that lender and/or lessor by using their own lending systems, a commercial lending company cannot determine the total number of loans and/or leases a customer has, including loans and/or leases with other lenders and/or lessors and their respective payment histories. Therefore, lenders and/or lessors perform manual checks by gathering D&B reports and checking the applicants' payment history with other commercial lending companies through a manual phone call. This method for checking payment history information is inefficient because it is extremely time consuming and can diminish the confidentiality of the potential loan and/or lease agreement. In addition, because this method is so time consuming, it is also rather ineffective because lenders and/or lessors do not want to take the time to properly check loan and/or lease references. This method is undesirable since it results in a number of inefficiencies including high costs to process applications, lost transactions since many borrowers are denied credit due to lack of information, and high operating costs to maintain staff to make manual telephone calls. There is reluctance among lenders and/or lessors to check credit references with other lenders and/or lessors for fear of opening the deal up to competition. Accordingly, credit decisions are made many times based upon incomplete information, which can result in one of two undesirable scenarios: either an unrecoverable loan is granted, or an applicant who could ultimately satisfy the payment schedule is denied a loan and/or lease. Lenders and/or lessors have traditionally entered into loans and/or leases despite this lack of information because lenders and/or lessors would rather accept less creditworthy deals than make no deals in an effort to maintain volume and profitability.

Despite the aforementioned problem, lenders and/or lessors have continued using the manual method for lack of a better alternative and because lenders and/or lessors currently have no facility for obtaining a comprehensive view of the applicant's leases and loans with other lenders.

As used herein, "lender" includes a lessor, as well as a party more traditionally thought of as a lender, e.g., a loaner of money. As used herein, "lease" or "loan" are used interchangeably.

BRIEF DESCRIPTION OF THE DRAWINGS

FIG. 8 is a detailed view of the executable programs in the exemplary software of FIG. 7.

FIG. 9 is a detailed view of the executable programs in the exemplary software of FIG. 8.

FIGS. 15 A-E are an illustration of an exemplary payment history report generated by an apparatus of FIGS. 1 and 2.

DETAILED DESCRIPTION OF PREFERRED EMBODIMENTS

A. Overview

Commercial lending companies become Members to the credit information service. In becoming a Member, the commercial lending companies agree to provide their experience regarding their customers' credit and business information, such as one or more of their current lease and/or loan obligations and payment history. This information may include leases, loans, lines of credit and business information. Members will be able to inquire about customers, such as borrowers and/or lessees, in the system (regardless of which commercial lending company provided the data) and retrieve payment history reports for any of the customers' outstanding loans and/or leases. Anonymity is maintained so that an inquirer cannot identify the lender, and unauthorized users are prevented from accessing payment history information. Members are then charged for these inquiry transactions.

B. System

Figure 1:
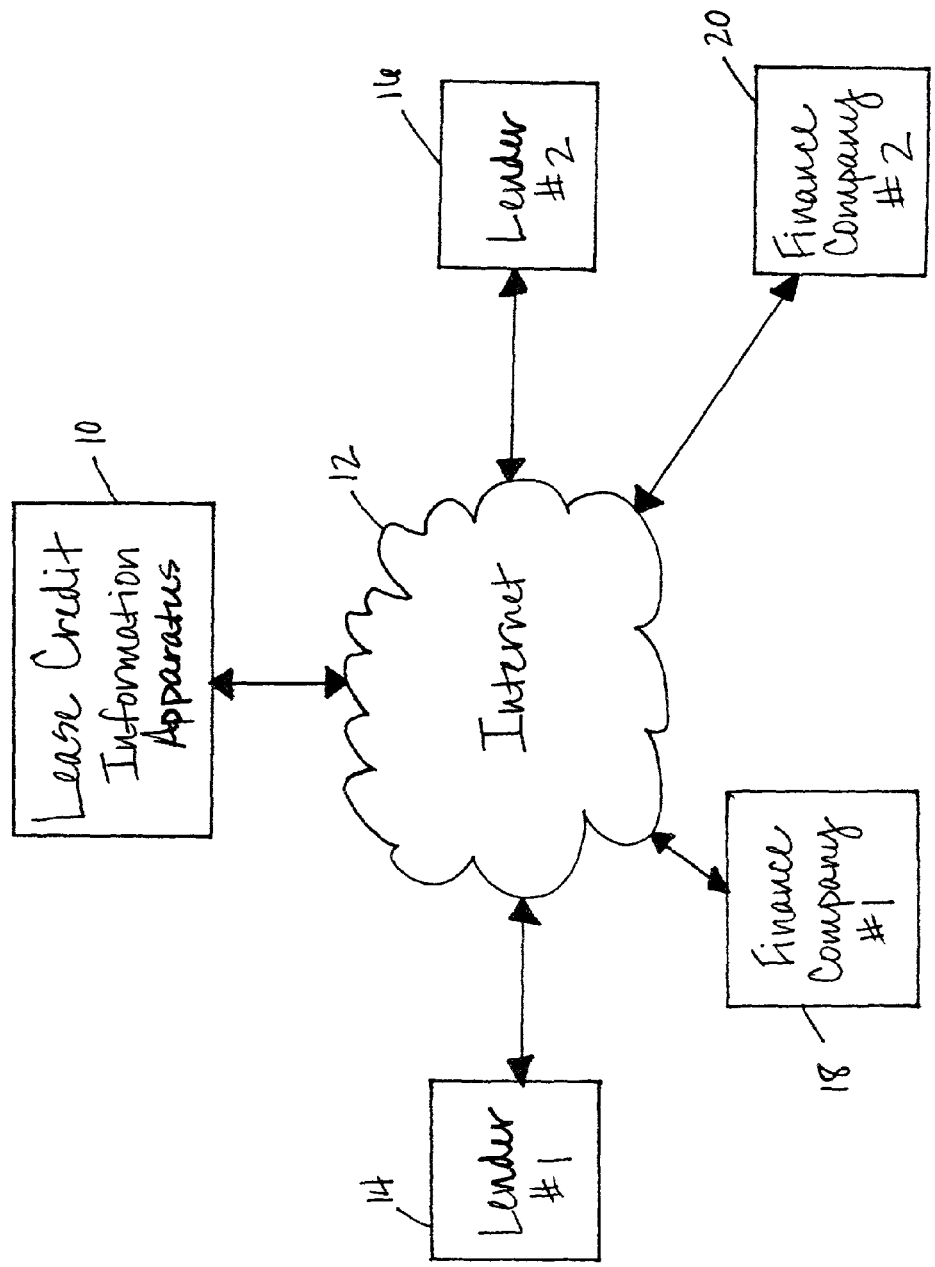
FIG. 1 is an illustration of an exemplary apparatus constructed in accordance with the teachings of the invention and shown in a preferred environment of use.

FIG. 1 illustrates an exemplary apparatus 10 constructed in accordance with the teachings of the invention for automatically exchanging credit information. As shown in FIG. 1, the disclosed credit information apparatus 10 is preferably implemented by a computer coupled to the Internet 12. However, persons of ordinary skill in the art will readily appreciate that the teachings of the invention are in no way limited to use with the Internet or to any other particular environment of use. Nonetheless, the credit information apparatus 10 is preferably implemented by a conventional server programmed to communicate over the Internet using conventional communication protocols (e.g., HTTP/IP). Optionally, more than one computer can be used to implement the credit information apparatus 10.

As also shown in FIG. 1, lenders and/or finance companies 14, 16, 18, 20 preferably also have access to computers by which they can access the Internet 12 for communication with the credit information apparatus 10. Such lender and/or finance company computers 14, 16, 18, 20 can be implemented by any known computing device, for example, a personal computer, and can connect to the Internet in any conventional manner (e.g., through a cable modem, a telephone line, a wireless connection, etc). As mentioned above, each of the lenders and/or finance companies 14, 16, 18, 20 can contact the credit information apparatus 10 to upload data from its own database concerning, for example, the credit history of its customers and/or to search for and download credit data concerning customers (or potential customers) of interest. In this way, lenders and/or finance companies (which may be competitors) are provided with a mechanism to share and/or pool credit history data without revealing information to competitors that could be used to their detriment.

Figure 2:
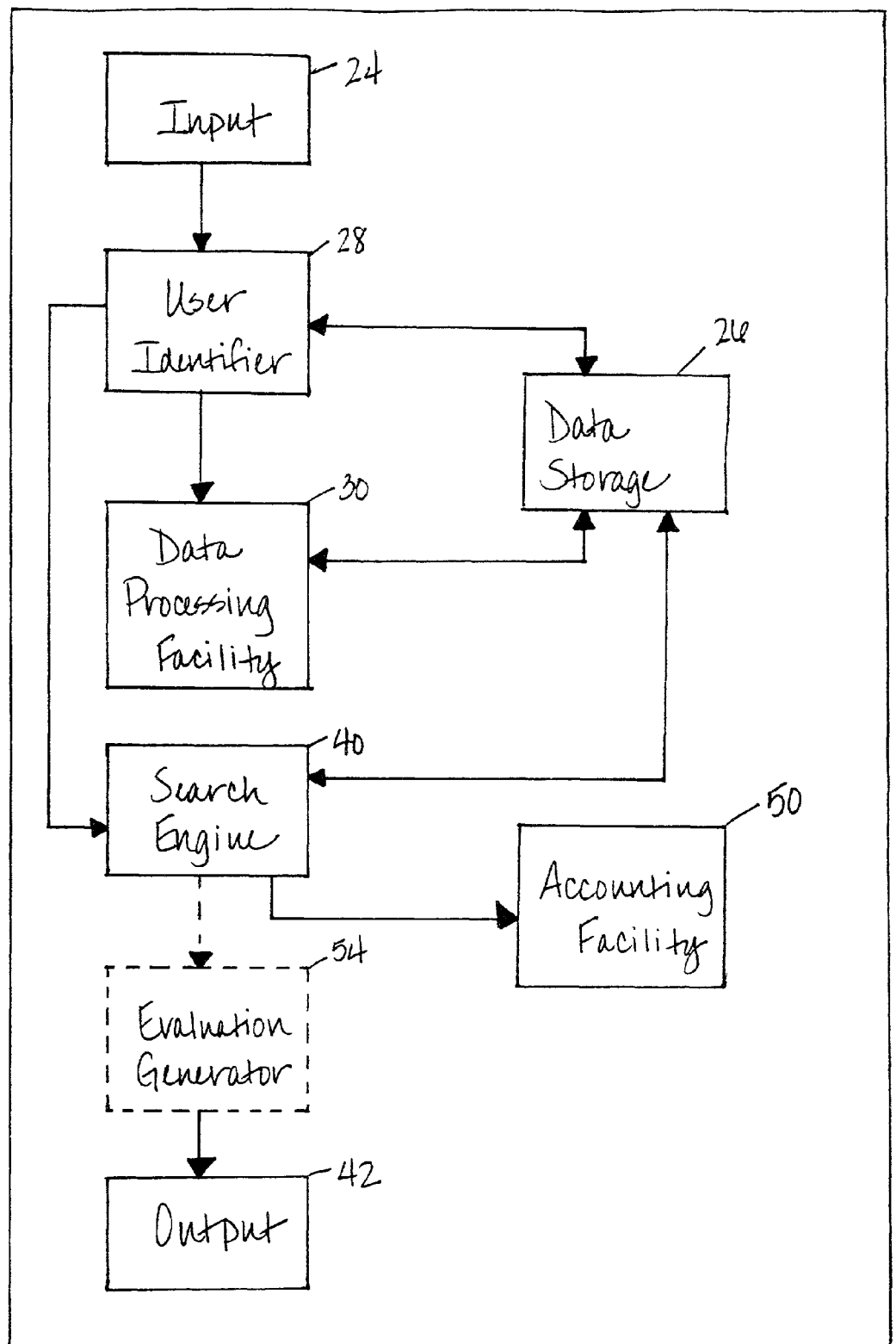
FIG. 2 is a more detailed view of the apparatus of FIG. 1.

A more detailed view of the apparatus 10 for pooling lease credit information is shown in FIG. 2. As shown in that figure, the apparatus 10 includes an input 24. The input 24 can be implemented by any conventional device known in the art (e.g., a modem, a keyboard, a mouse, etc.)

As shown in FIG. 2, the apparatus 10 is provided with a conventional data storage device 26. The data storage device 26 can also be implemented by any known device capable of storing the credit information received from the input device 24. For example, the data storage device 26 can be implemented by a hard disk drive or a tape drive.

For the purpose of limiting access to the credit information stored in the data storage device 26, the apparatus 10 is further provided with a user identifier 28. The user identifier 28 has access to administrative data stored in the data storage device 26. In particular, when a user accesses the apparatus via input 24, the user is asked to enter a user name and/or a password. The user identifier 28 scans the administrative data stored in the data storage device 26 for the user name and/or password to verify that the user is authorized to access the apparatus 10. If the user is not recognized by the user identifier 28, an error message is sent and the user will not be able to access the credit information stored in the apparatus 10. Preferably, users which are not recognized by the user identifier 28 will also be prevented from inputting data into the apparatus 10 to prevent vandalism. If the user is recognized by the user identifier 28, the user will be able to access the credit information stored in the apparatus 10.

Figure 3:
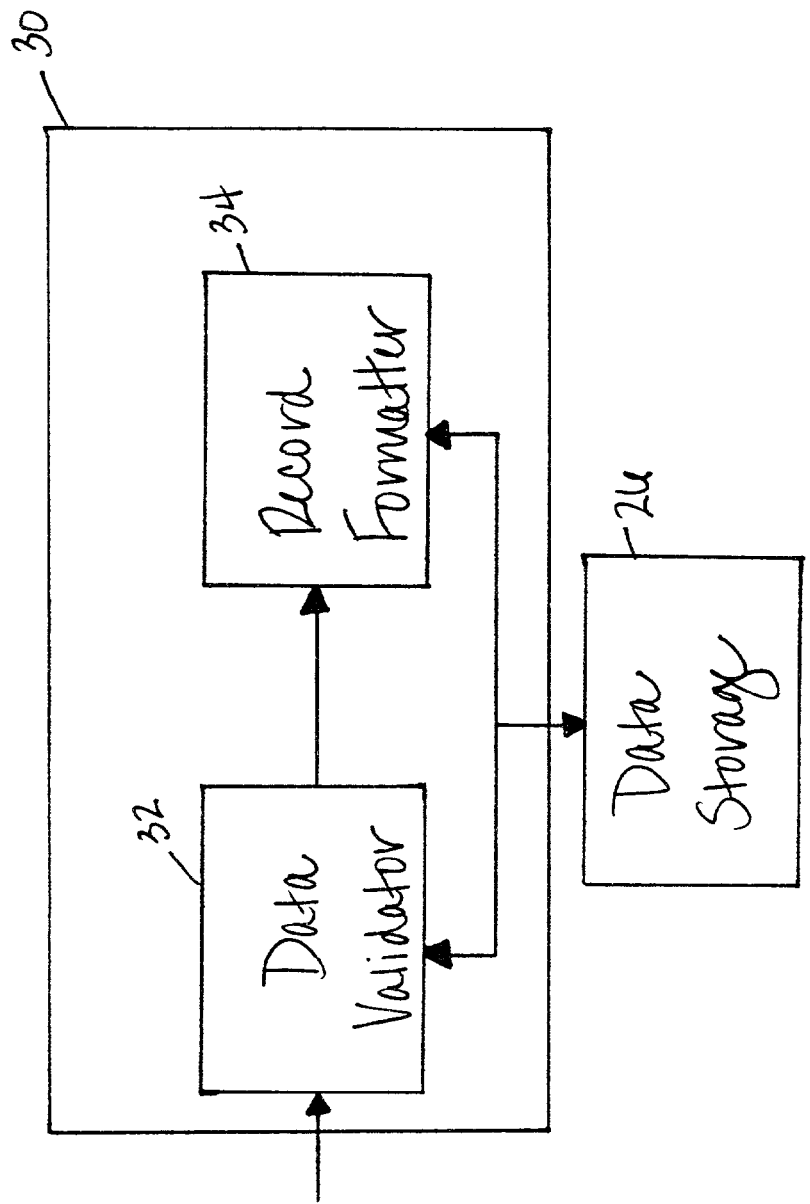
FIG. 3 is a more detailed view of the data processing facility of FIG. 2.

For the purposes of processing credit information received at the input 24 from the user recognized by the user identifier 28, the apparatus 10 is further provided with a data processing facility 30. As shown in FIG. 3, the data processing facility 30 includes a data validator 32 and a record formatter 34. The data validator 32 is structured to test the credit information received via input 24 for validity. The record formatter 34 is structured to convert the credit information received via input 24 to a predetermined format for storage in the data storage device 26. The data validator 32 and the record formatter 34, therefore, cooperate to ensure that the data storage device 26 includes only valid data that has been formatted for searching and use by the apparatus 10. The tests performed by the data validator 32 will be explained in further detail below. Preferably, however, the data validator 32 tests the credit information by comparing it to prior credit information which has previously been stored in the data storage device 26.

In order to enable searching of the data storage device 26, the apparatus 10 is further provided with a search engine 40 (FIG. 2). The search engine 40 is responsive to a request from a requester for credit information to access and search the data stored in the data storage device 26. The search engine 40 can be implemented by any known searching methodology. However, the search engine 40 is preferably constructed such that any responsive credit information output to the requester via output 42 does not disclose the identity of the lender that provided the credit information. Withholding the lender identification information associated with the credit information identified by the search engine 40 ensures that lenders providing information to the system are not put at a competitive disadvantage.

In order to generate revenue for the entity operating the apparatus 10, the apparatus 10 is further provided with an accounting facility 50. The accounting facility functions to charge a search fee to the requester that initiated the search performed by the search engine 40. Preferably, the search fees exceed the usage fees. The difference between the search fees and the usage fees comprise a revenue source to the entity operating the apparatus 10. Preferably, the accounting facility 50 is structured to automatically debit and credit banking and/or credit card accounts of the users participating in the system. However, the accounting facility 50 could also be structured to generate periodic invoices/statements for the participating users. These invoices/statements could be printed and mailed and/or sent via e-mail, as is conventional.

The accounting facility 50 may also cooperate with the search engine 40 to credit usage fees to the provider of any information that is output by the output device 42. The accounting facility 50 recognizes a data output, and automatically credits the account of the provider of the output information.

The output device 42 can be implemented by any conventional device. For example, the output device 42 can be implemented by a monitor, a printer, and/or a communication device such as a modem. In the latter case, the output device 42 is preferably coupled to the Internet to enable a remotely located user to perform searches of the apparatus 10.

Persons of ordinary skill in the art will readily appreciate that, although the user identifier 28, the data processing facility 30, the search engine 40, the accounting facility 50 and the evaluation generator 54 can be implemented by hardware or firmware, in a preferred embodiment, each of those elements are preferably implemented by software. Exemplary software for implementing those elements will now be described in connection with the flowcharts shown in FIGS. 4-7, 10, 12-14. Persons of ordinary skill in the art will further appreciate that, although for ease of explanation, the flowcharts illustrate and describe a series of steps in a particular temporal sequence, other temporal sequences and steps can be used to implement any part of the apparatus 10 without departing from the scope or spirit of the invention.

Figure 4:
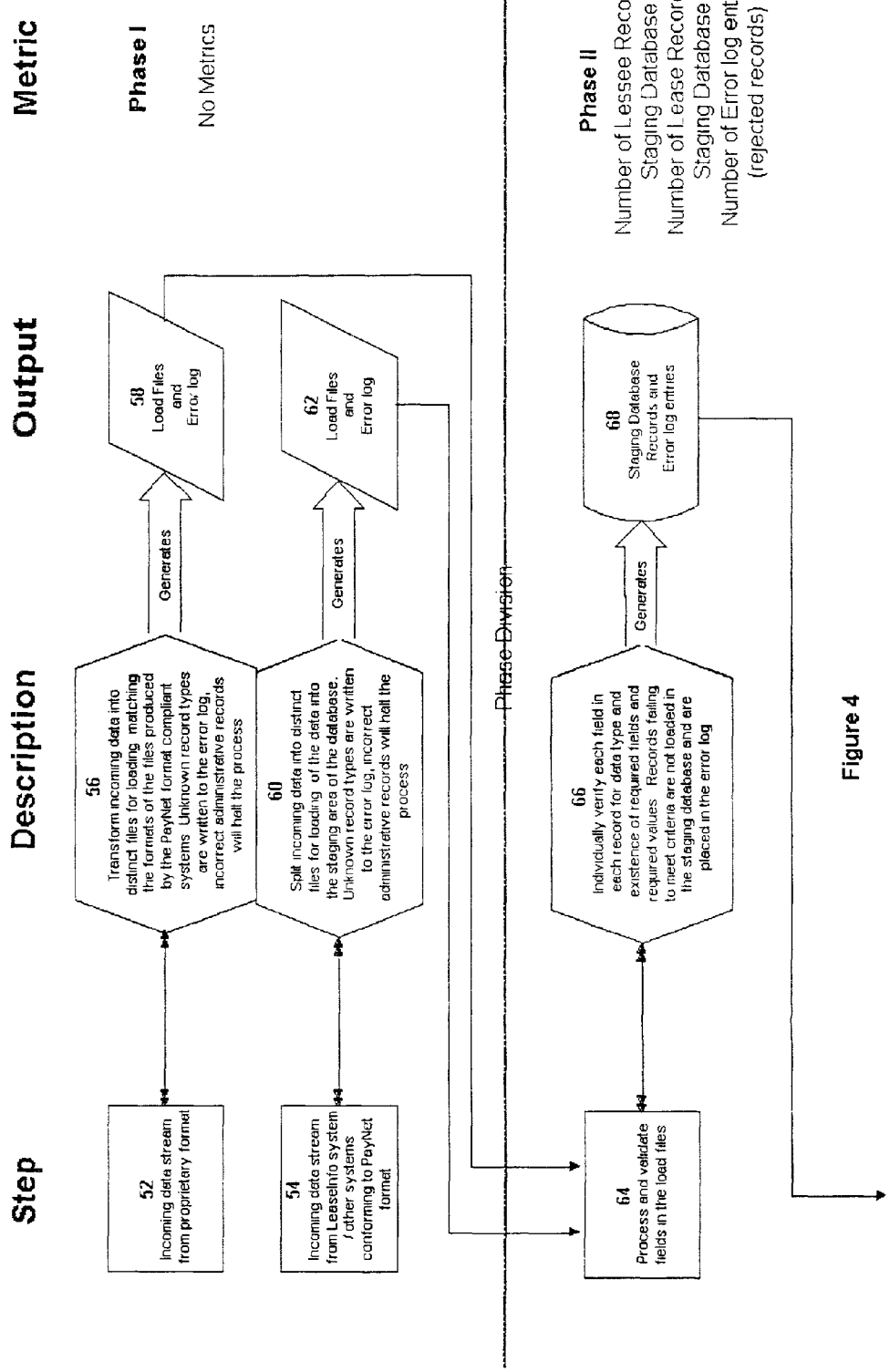
FIGS. 4-5 are an illustration of exemplary software that can be used to implement the apparatus of FIGS. 1 and 2.
Figure 5:
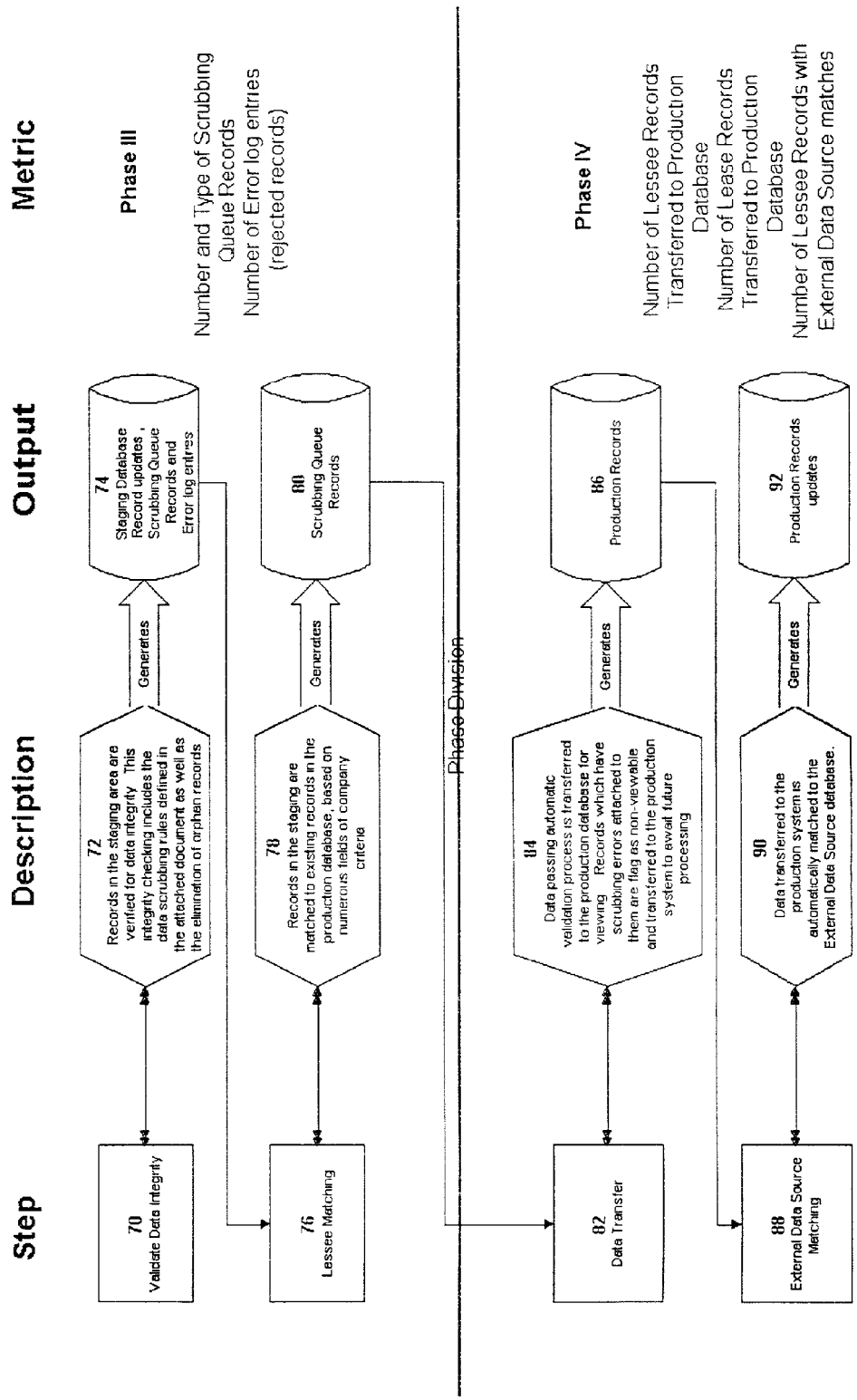

FIGS. 4-5 show a general overview of the system for automatically exchanging credit information between the member and the apparatus 10. The apparatus 10 receives incoming data from either a proprietary format, block 52, or from a format that already conforms to the format of apparatus 10 (block 54). If the incoming data is in a proprietary format, the data is transformed into distinct files for loading, matching the format of the apparatus 10 (block 56). Unknown record types are written to an error log, and incorrect administrative records will stop the loading process. The files are then loaded to the apparatus 10 and an error log is generated, if necessary (block 58). If the incoming data conforms to the format of the apparatus 10, the data is split into distinct files for loading of the data into the staging area of the database (block 60). Unknown record types are written to an error log, and incorrect administrative records will stop the loading process. The files are then loaded to the apparatus 10 and an error log is generated, if necessary (block 62).

Once the files are loaded, the fields located in the load files are processed and validated (block 64). Each field in each record is individually verified for its data type and for the presence of required fields and values. Records that fail to meet this criteria are not loaded in the staging database and are placed in the error log (block 66). The staging database records are then generated, and error log entries are made, if necessary (block 68).

Next, the integrity of the data is validated, block 70, which includes ensuring that various data scrubbing rules are met, as well as the elimination of unknown records (block 72). Once this validation is performed, the staging database records are updated, and scrubbing queue records (i.e., suspect data) and error log entries are made, if necessary (block 74).

Lessee matching is then performed, block 76, wherein records in the staging database are first matched internally within the member, and then matched to existing records in the production database of apparatus 10, based on numerous fields of company criteria (block 78). Scrubbing queue records are then generated, block 80, and data transfer between the member load/scrubbing database and the apparatus 10 is performed (block 82). As shown in block 84, incoming data passes the automatic validation process (blocks 70 and 72), and the data is transferred to the production database of the apparatus 10 for viewing. If, however, incoming data does not pass the automatic validation process (blocks 70 and 72) and scrubbing errors are attached to the data (block 74), the records within this data are flagged as non-viewable and transferred to the production system to await future processing.

Once the data is successfully transferred to the apparatus 10, production records are generated, block 86, and External data source matching is performed, block 88, wherein data that is transferred to the production system of apparatus 10 is automatically matched to the External data source database (block 90). Finally, production records are updated once this matching is performed, shown at block 92.

Figure 6:
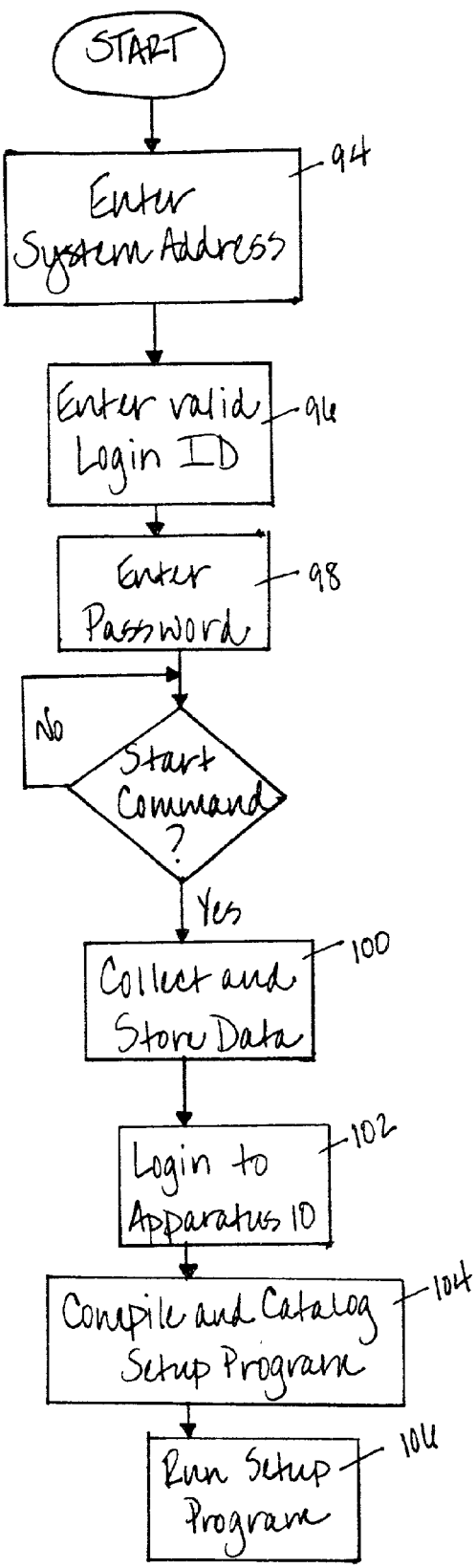
FIG. 6 is an illustration of exemplary software for implementing the loading process of FIG. 10.

Following is a more detailed discussion of the system as shown generally in FIGS. 4-6, which applies specifically to InfoLease™ systems by International Data Systems in Minnesota. Upon a member's initial subscription to the system, the member will receive a setup program necessary to install software to communicate with the apparatus 10, shown generally in FIG. 6. To begin, the member will enter the member's lease system address (block 94). Next, the member will enter a valid Unix Login ID (block 96). Finally, the member will enter a password for the aforementioned Login ID (block 98).

Next, the member will collect and store its system data (block 100), wherein the appropriate files are moved to a /tmp (i.e., temporary) directory on the member's Unix system. This directory will contain a copy of the member's data so that the integrity of the member's original data is not affected. The member then logs in to the apparatus 10 (block 102) and compiles and catalogs a setup program (block 104). The setup program is run at block 106.

Figure 7:
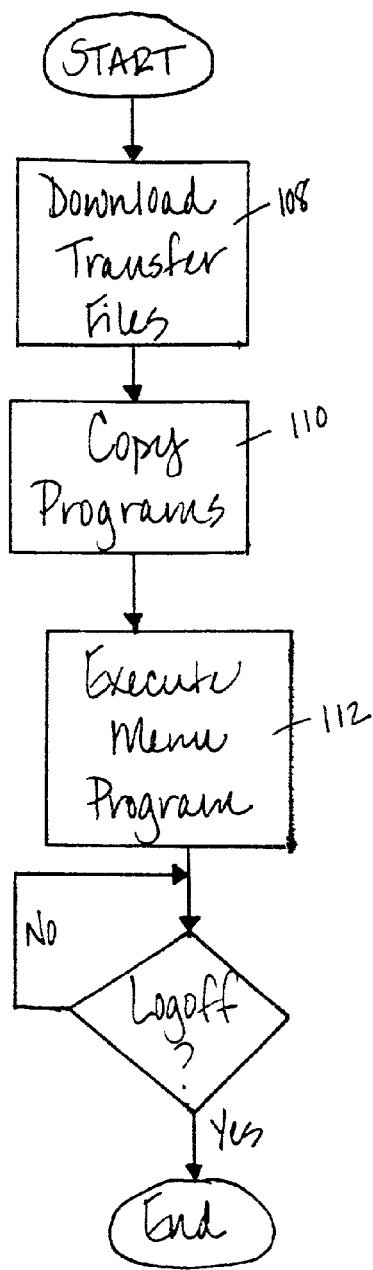
FIG. 7 is an additional illustration of exemplary software for implementing the loading process of FIG. 10.

The setup program described above then performs various functions, shown generally in FIG. 7. First, multiple transfer files are downloaded from the apparatus 10 to the member's computer (block 108). These transfer files contain various transfer programs, the transfer file FTP directory, and the transfer file build directory and holding area. If, during the installation process, the transfer program cannot find the FTP or build directories, these directories are then recreated automatically.

Second, various programs are copied from the apparatus 10 (block 110). These programs control the transfer and retransfer of leasing information, the record maintenance ("MAINT"), the transfer menu ("MENU"), and the system account copy and/or update process. Finally, the MENU program is executed by the member (block 112). Now the member's computer is set up to communicate with the apparatus 10, which will allow the member to exchange its leasing and credit information with the apparatus 10. Blocks 94-98 (in FIG. 6) are typically only performed the first time a member logs on to the apparatus 10. On subsequent visits to the apparatus 10, the file transfer process will skip from block 102 to block 112.

Upon execution of the MENU program (block 112), a display becomes available as shown in FIG. 8. The member will then be able to choose from the selections that appear in the display. The first selection in FIG. 8, Control Maintenance, maintains the transfer control record to verify the integrity of the file transfer process between the member's system and the apparatus 10. The second selection, Lease Transfer, builds the transfer file and executes the transfer of the member's lease information to the apparatus 10 via Internet transfer or e-mail. The third selection, Lease Re-Transfer, runs the same program as the Lease Transfer, but bypasses the building of the transfer file. This option allows a retransmission of the file if problems with connecting to the Internet transfer server or the remote e-mail host are experienced. The fourth selection, Lease Transfer Status Inquiry, displays the log file from the last transfer attempt via a conventional Unix command. The fifth selection, Remove Prior Transfer Files, allows the member to remove prior transfer files from a transfer directory. Finally, the sixth selection, Copy to Another Account, allows a system administrator for the member to copy all of the necessary programs and files to another account.

The MAINT program, referenced above, may also be executed by the member, wherein a display becomes available as shown in FIG. 9, which allows the member to maintain the transfer control record. The member will be able to choose from the selections that appear in the display. The Member Identifier selection represents an identifier that is assigned to the member. This identifier should be used in both the file names and on the records within each file. The Portfolio Identifier represents a member supplied identifier which indicates the specific system the files are coming from. Because members may run multiple systems, this identifier will prevent any confusion if duplicate customer IDs or lease numbers are used in the multiple systems. This identifier should be used in both the file names and records within the file. The Member Load Password is provided by the member and is used for verification of the file prior to processing. The Log E-Mail Address allows the member to have the build and transfer log from the Lease Transfer/Re-Transfer processes (described in FIG. 10, below) e-mailed to the address upon completion of the transfer process. The Transfer Type tells the transfer program the type of transfer the member uses: (B)uild only, (E)-mail transfer, or (H) Internet transfer. The Destination E-Mail Address is used to transfer the file to the apparatus 10. This field is a required entry if the transfer type is "E" for an E-mail transfer. The Internet Transfer Name/IP Address selection represents the hostname or IP address used by Internet transfer to transmit the transfer file to the apparatus 10. This field is a required entry if the transfer type is "H" for an Internet transfer. The Internet Transfer Login ID represents the login ID used by the Internet transfer protocol to connect the Internet transfer host. This field is a required entry if the transfer type is "H" for an Internet transfer. The Internet Transfer Login Password represents the password used in conjunction with the login ID used by the Internet transfer protocol to connect the Internet transfer host. This field is also a required entry if the transfer type is "H" for an Internet transfer. The Test Mode (Y/N) selection forces the member to test the member ID, the portfolio ID (if it is not already loaded), and the member load password identifiers for the apparatus 10 from within the transfer program. This field should be reset to "N" after completing the initial testing of the transfer. The Maintain History (Y/N) selection maintains an archive of transfer files that should be deleted manually through the MENU program. If the transfer files are not deleted manually, only the most recent transfer file will be saved. The Transfer Run Default selection is used to load the defaults for the prompts within the transfer program of the apparatus 10. These fields are not required. The (S)leep, (I)mmediate selection loads the default to run the transfer program immediately or to sleep and run at a specified time. This field can be manually overwritten from the prompts within the transfer program unless the transfer program prompts have been turned off. The Sleep Until hh:mm:ss selection allows the member to enter a valid time for the transfer process to wait to start processing the build and transfer fields if the sleep option is used. The Compress Transfer File selection allows for a faster file transfer via E-Mail or Internet transfer. The member can enter "Y" to Unix compress the transfer file prior to exporting the file to its destination, which will substantially reduce the size of the transfer file. The Prompts in Transfer Pgm selection allows the member to turn the transfer program prompts off and on. The Last Transfer Date field displays the last date the transfer process was started. The Last Transfer Start Time displays the last time the transfer process was started. This field can be set after any sleep commands are executed. Finally, the Last Transfer End Time displays the ending time of the last transfer process.

Figure 10:
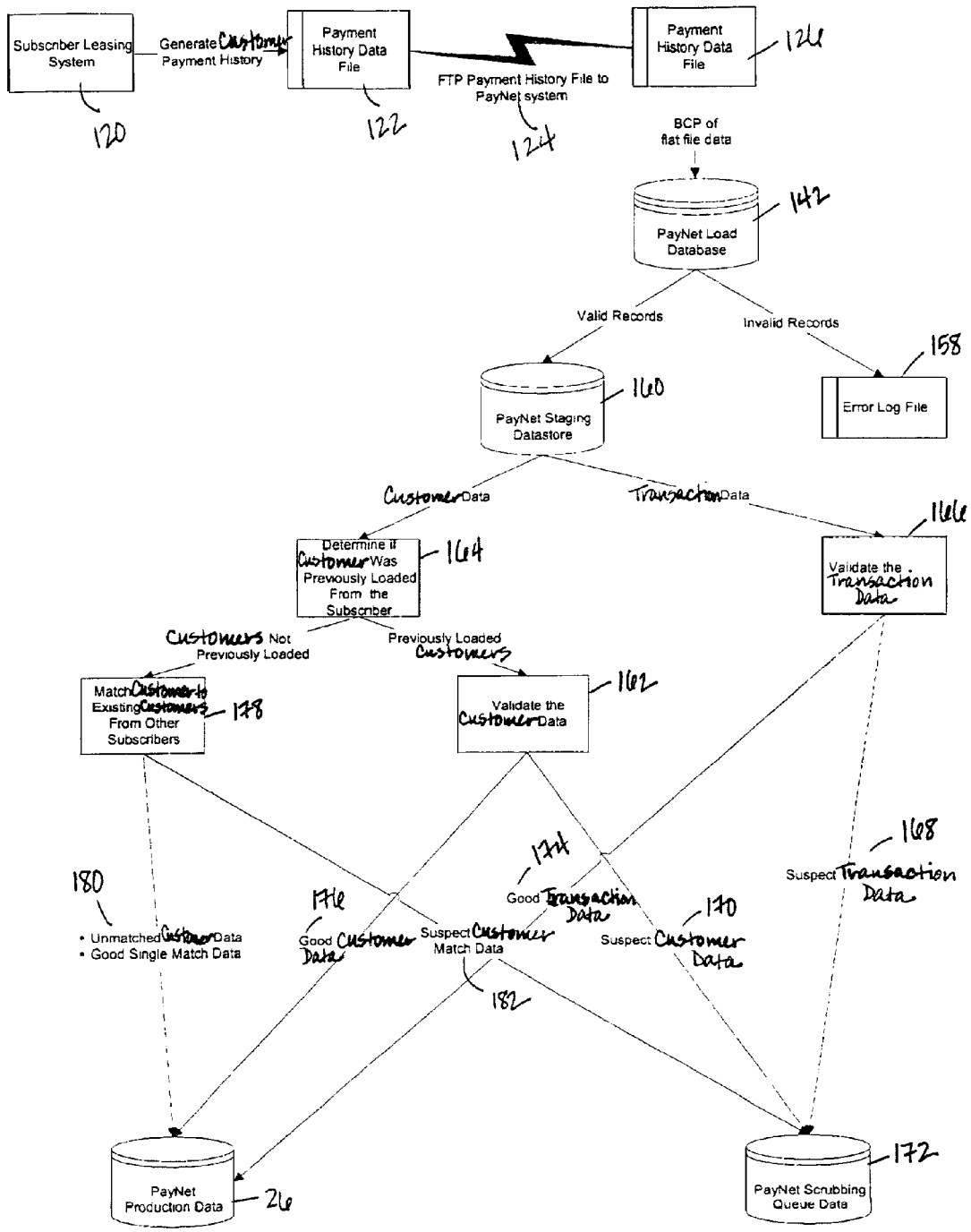
FIG. 10 is an illustration of exemplary software that can be used to implement the apparatus of FIGS. 1 and 2.
Figure 11:
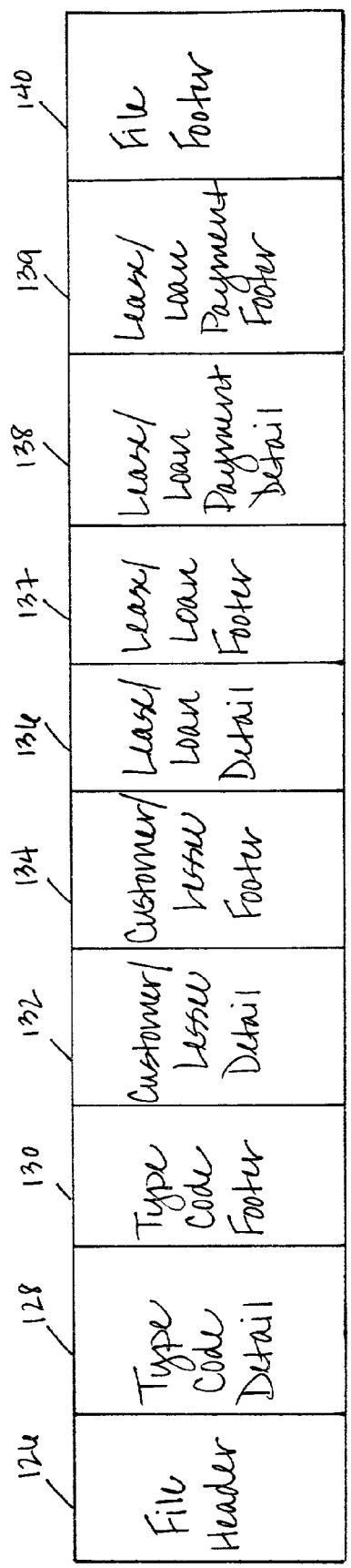
FIG. 11 is an illustration of an exemplary payment history data file.

The following section describes the data extraction process regardless of the member's information and accounting system type. Members to the aforementioned apparatus are assigned an identifier that is used in both the file names and records within their file. This identifier will maintain the confidentiality of the member, so that its actual identity is not revealed in any search results. As shown in FIG. 10, to load data into the apparatus 10, the apparatus 10 extracts predefined records relating to payment history data from the members' respective lease information and accounting systems 120, such as InfoLease™, into a payment history data file 122 with the identifier included in the file name. The member lease information and accounting systems contain numerous records, such as asset master files, customer default master files, customer master files, lease payment history files, lease contract A/R address files, lease contract billing files, lease contract customer address files, lease contract master files, lease payment cross-reference files, lease payment schedules, and control records. The data file 122 is then loaded via the Internet (preferably using the https protocol) to the apparatus 10, shown generally at 124. This is the Lease Transfer/Re-Transfer process referred to in FIGS. 8 and 9 above. The payment history data file 122 will typically contain numerous files, which are then compiled into a single payment history data file. This single payment history data file contains numerous records, such as a file header, type code detail, type code footer, customer/lessee detail, customer/lessee footer, lease/loan detail, lease/loan footer, lease/loan payment detail, lease/loan payment footer, and file footer. As shown in FIG. 11, the file header 126 contains the member identifier, which is used for verification prior to processing. The file header 126 should be the first record in the file. The type code detail record 128 provides type code translations for the various types of data fields that are included in the payment history data file 122. Such data fields may include the equipment type, which indicates what is being financed, the loan or lease type, which categorizes the actual loan or lease (operating lease, capital lease, leverage lease, or conditional sale or loan, etc.), the ownership type, which indicates the business type or ownership of the customer/lessee (S Corporation, Proprietorship, LLC, or Limited Partnership, etc.) and the purchase option, which categorizes the end of loan and/or lease options (fair market value, guaranteed purchase, or fixed purchase option, etc.). The type code footer 130 indicates how many type code detail records 128 exist in the payment history data file 122. The customer/lessee detail record 132 provides the main information about a single customer/lessee, and the customer/lessee footer record 134 indicates how many customer/lessee detail records 132 exist in the payment history data file 122. The lease/loan detail record 136 provides common information about a loan and/or lease, such as the customer, original amount, payment amount, and status of the loan and/or lease at a certain point in time (i.e., delinquency and loss amounts). The payment history data file 122 may contain more than one lease/loan detail record 136 for a particular lease, as long as the "as of date" is different. For example, there may be a record for both the August and September delinquency status for a lease in the same payment history data file 122. The lease/loan footer record 137 indicates how many lease/loan detail records 136 exist in the payment history data file 122. The lease/loan payment detail record 138 provides common payment information about a loan and/or lease. The lease/loan payment footer 139 indicates how many lease/loan payment detail records 138 exist in the payment history data file 122. Finally, the file footer record 140 is included for verification purposes, to signal the end of the payment history data file 122. Accordingly, the file footer record 140 should be the last record in the file, so that the apparatus 10 knows the entire payment history data file 122 was received. In addition to the data described above, the payment history data may also include information such as the member's account identification, the lessor's customer identification for the customer, the lender's loan and/or lease identification, the customer's name, address, telephone number and SIC code, the loan and/or lease start date, the loan and/or lease amount, the current balance, the payment amount, the number of remaining payments, and the number of times the customer has been late in paying. In addition to the foregoing information, alternative customer names and addresses may be stored in the database, as well as the customer's Taxpayer Identification Number (TIN) and credit bureau numbers.

Returning to FIG. 10, the apparatus 10 preferably includes a load database 142 for buffering newly received records. There are at least two ways to load data into the load database 142: initial loading and incremental loading. The initial loading of payment history data by a member will usually include a large amount of information due to the length of time that the payment history data will cover. Accordingly, the initial loading is preferably performed by transmitting the payment history data files to the apparatus through use of the Internet transfer or on a CD. The apparatus provides detailed specifications to the member relating to how the data is to be derived and the format for transmitting the data to the apparatus.

The incremental loading of payment history data may be performed on a regular basis by each member. For incremental loading, members extract information about new leases that were booked during the time period since the last data load, loans and/or leases that remained active during the time period since the last data load, and loans and/or leases that were terminated during the time period since the last data load. Preferably, incremental loading is performed by transmitting the payment history data files through the Internet, but other methods may be used.

Figure 12:
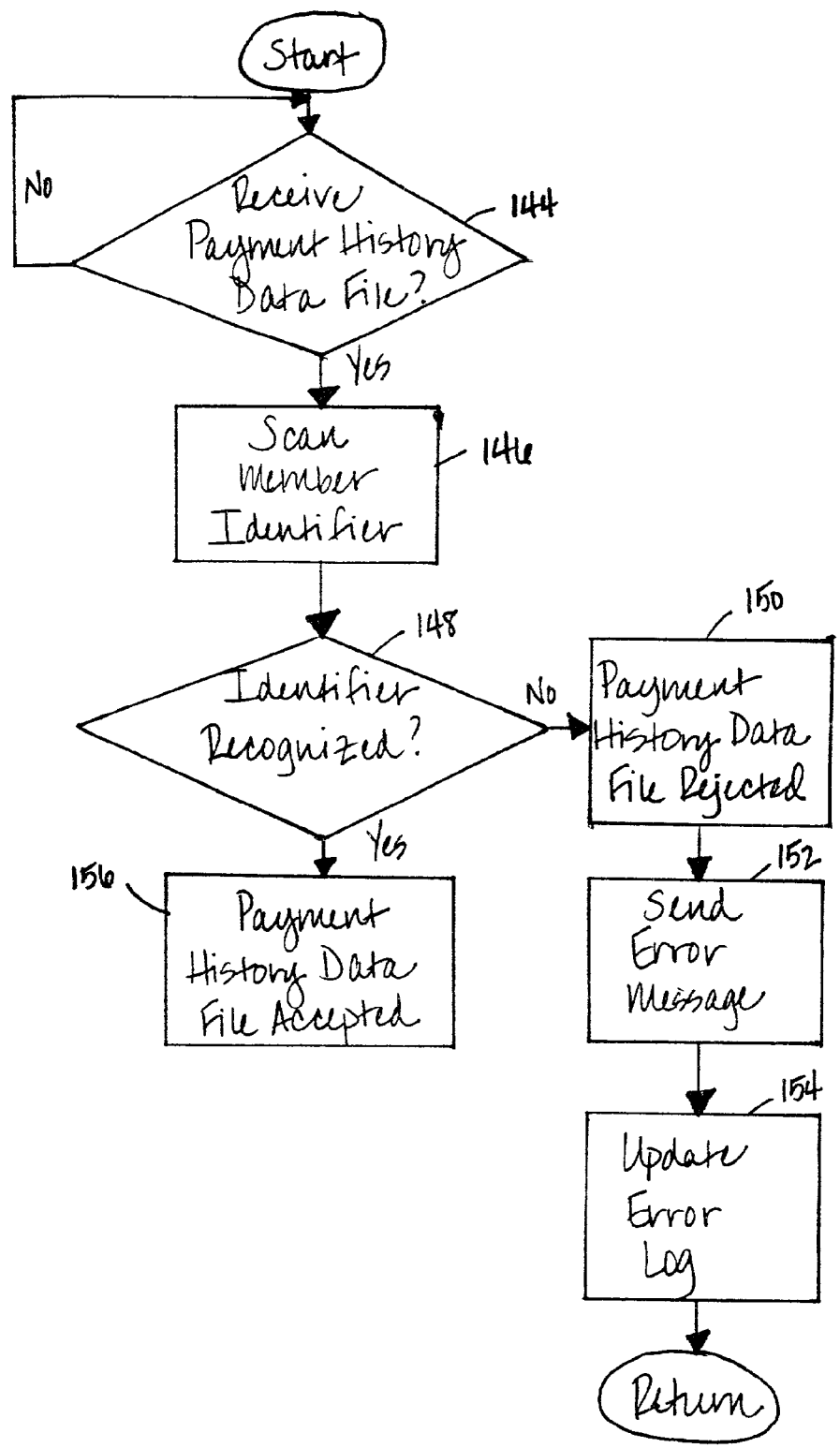
FIG. 12 is a more detailed view of the data loading process of FIG. 10.

The payment history data file 122 is preferably treated as a batch and includes the member identifier and control records for validating the file. A more detailed flow chart showing the process of uploading data to the apparatus is shown in FIG. 12. As shown in FIG. 12, the process is initiated when the apparatus 10 receives a payment history data file (block 144). To maintain confidentiality for the system participants, the lender's identification will not be disclosed to the member. This information will be collected, however, to facilitate data validation and verification. In addition, identification of the member who submits each payment history report may be necessary to ensure that members are credited when information they supply to the system is inquired upon. To properly identify submitted information and avoid vandalism (e.g., submission of bad data), the user identifier 28 (FIG. 2) of the apparatus 10 first scans the file for a member identifier (block 146). If any data in the file does not have the appropriate identifier and is not recognized by the apparatus 10 (block 148), the entire file is rejected (block 150). An error message is created and sent to the data submitter indicating that there were problems with the file (block 152). A notation is then placed in an error log file (block 154). This updating of the error log is also shown at block 158 in FIG. 10. Control then returns to block 144 until another file is received.

If, at block 148, the user identifier 28 (FIG. 2) of the apparatus 10 determines that the file does have an appropriate identifier, the file is accepted (block 156) and passed to the data processing facility 30 (FIG. 2) for placement into the system database 26 (block 160 of FIG. 10).

As mentioned above, the data processing facility 30 (FIG. 2) validates, edits and loads received files into the system database 26. Upon receipt of a payment history data file 122 (FIG. 10), the data validator 32 of the data processing facility 30 analyzes the file for customer transaction data, such as loan and/or lease data. If the file contains data on a customer that was previously loaded from a member (block 164), that data is tested for validity (block 162). Customer data is tested by matching the business information of the customer (e.g., customer name, address, phone number, number of employees, etc.) with information contained in a general business information database, separate from the load database 142 of the apparatus 10. Different thresholds for triggering suspect customer data are set by individual members.

Similarly, all transaction data that is loaded into the system database 26 (FIG. 2) is also tested for validity (block 166). As part of the validation process for the transaction data, different thresholds for triggering suspect transaction data are set by individual members, and are based on different factors such as large time differences between records, records that contain payment amounts outside a maximum expected range, or records that appear on current records when they should have appeared on previous records. For example, if a payment that was overdue 90 days appears on a payment history report but did not appear on the previous payment history report as 60 days overdue, that payment history data may be flagged as suspect. If there is suspect transaction data, as shown at 168, or suspect customer data, as shown at 170, that suspect transaction or customer data is stored in a scrubbing queue 172 for manual review and data cleansing. If there is good transaction data, as shown at 174, or good customer data, as shown at 176, that good lease or lessee data is stored in the system's data repository.

Returning to block 164 (FIG. 10), if the data processing facility 30 (FIG. 2) determines that the file contains data on a customer that was not previously loaded from a member, it initiates matching routines (block 178) to apply new payment history data to existing customers in the system, or to create new customers for payment history data that has no matching customer in the system. The same scrubbing routine described above is also performed on the matched or unmatched customer data. If there is unmatched customer data that is determined to be valid data, that data is sent and added to the system's data repository, as shown at 180. If there is matched customer data that is determined to be suspect data, that data is sent to the scrubbing queue 172, as shown at 182, where manual data cleansing is subsequently performed. If there is matched customer data that is determined to be suspect data, that data is sent to the scrubbing queue 172, as shown at 182, where manual data cleansing is subsequently performed.

The scrubbing routines described above are performed to remove or hold in suspense erroneous or suspect data, so that members to the system cannot query against them. During the scrubbing routines, suspect payment history data is reported on and can be modified by the system, both manually and automatically. As part of the manual data cleansing process, the records in the scrubbing queue 172 are checked manually by having a data consultant call the finance companies to verify the information in each record. The automated process occurs when the system has identified from a previous manual check that the record is incorrect and the system automatically changes the record to what it should correctly show.

After the loading process is completed, the apparatus 10 maintains information about each batch of reports that are loaded, such as the member identification, the time and date of the transfer, the number of reports submitted, the number of error-free reports, and the number of errors.

Figure 13:
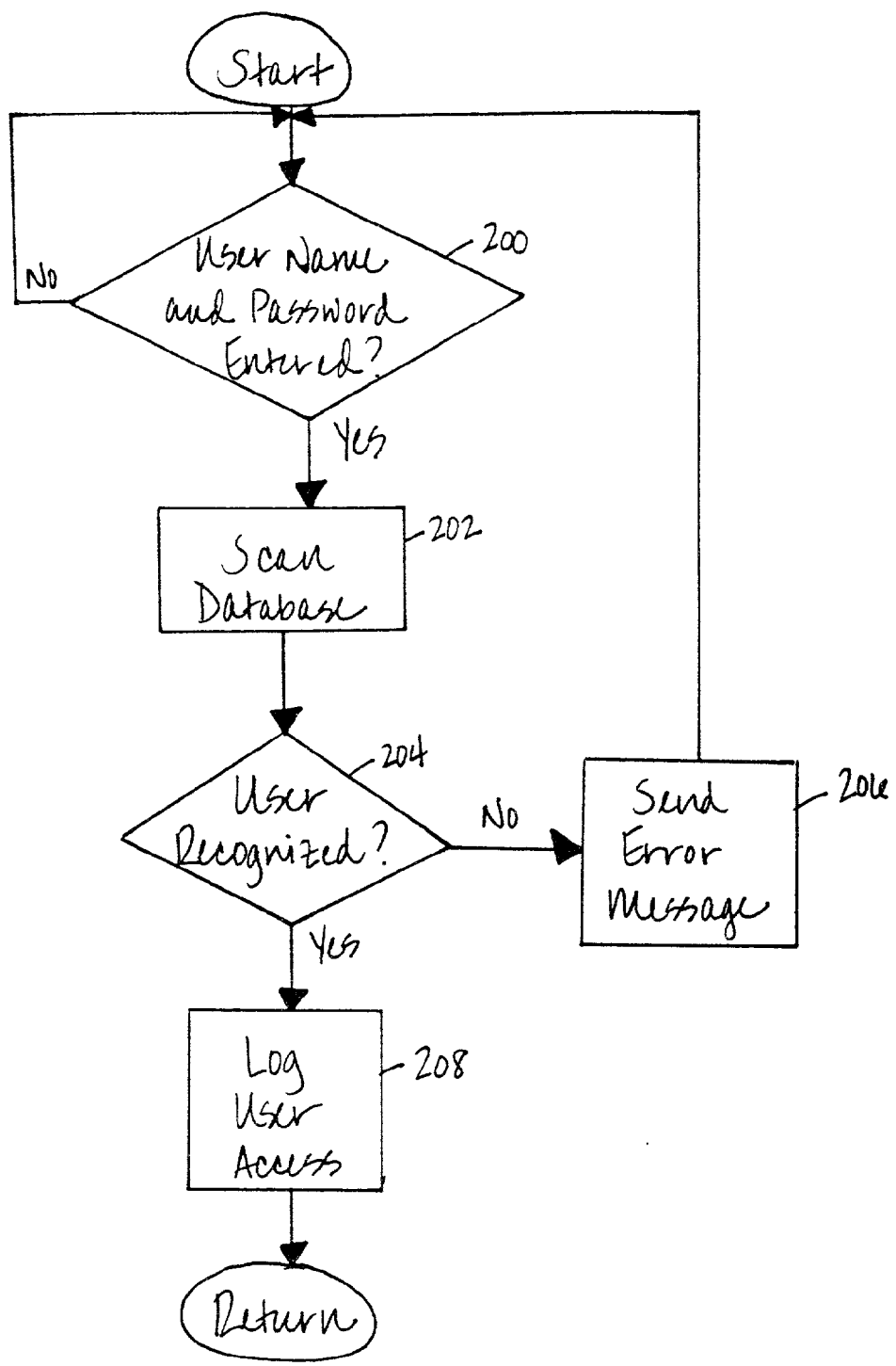
FIG. 13 is an illustration of exemplary software for implementing the user identifier of FIG. 2.

Members can inquire about a customer's lease payment history by accessing the apparatus 10 and requesting data. The user accesses the apparatus 10 by entering a user name and password. As shown in FIG. 13, when a user name and password are submitted (block 200), the user identifier 28 scans the database 26 for a matching record (block 202). If a match is not found, the user is not recognized (block 204). The user identifier 28 will then return an error message (block 206) and log the failed access attempt. Control then returns to block 200.

If the user is recognized (block 204), the user identifier 28 records the date and time of the access along with the identity of the user accessing the apparatus 10 (block 208). The user is then given permission to access the apparatus 10.

Figure 14:
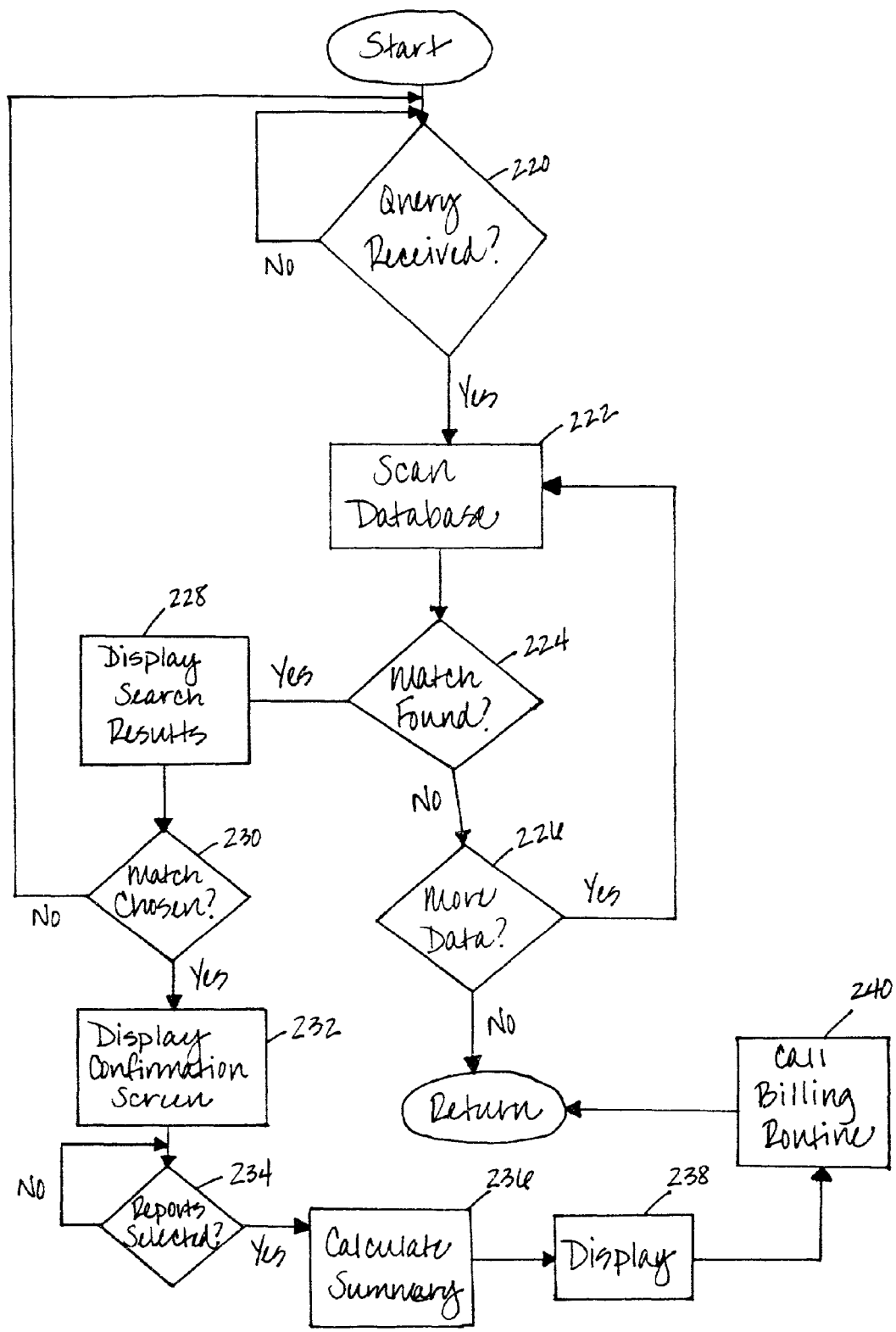
FIG. 14 is an illustration of exemplary software for implementing the search engine of FIG. 2.

The recognized user can initiate a search of the apparatus 10 by entering one or more of the following into a query request screen: the company's name, address, telephone number, TIN, Owner's SSN, or some other credit bureau identification number. As shown in FIG. 14, the search engine 40 uses the information provided by the member, including partial names and addresses, to attempt to find a match to the query request. In particular, when the search engine 40 receives the member query (block 220), it scans the payment history data within the system database 26 (block 222). If a match is not found (block 224), the member is prompted to provide additional information, or to contact the system's customer service for assistance (block 226). If any matches are found (block 224), the apparatus 10 will display the search results (block 228). The apparatus 10 will only provide members with a list of near matches (up to 24), to thereby preclude members from using the system to randomly search for lessees. The user is prompted to choose the desired company from the list of similars (block 230), which takes them to the confirmation/report selection screen (block 232). On this screen, the user chooses the desired report sections from the list of active sections for this company (block 234). The user is then required to "click" on the generate report button which confirms their intent to purchase the information. The system then generates the report to the screen (block 238) and initiates the billing routine (block 240).

If the user provides more data (block 226), control returns to block 222 where another search is performed. If no additional data is provided, control returns to block 220 without displaying the search results to the user so the user can optionally initiate a new search.

If a company summary report is requested (block 234), the evaluation generator 54 (FIG. 2) performs predetermined mathematical analysis of the credit information developed in the search to develop a summary of that credit history information (block 236). This summary preferably includes a scoring of the borrower's payment ability and certain benchmark statistics, such as high credit value, total loan and/or lease balance, total current payments, and the total number of times the customer was late in paying. Preferably, the developed summary is output to the requester along with the detailed search results (block 238). The search results preferably include the following pieces of information: the customer's name, address, telephone number, SIC code, and for each loan and/or lease the customer has, the loan and/or lease start date, the loan and/or lease amount, the current balance, the payment amount, the number of remaining payments, and the number of times late and the amounts the customer has been late in paying. An example of a summary which could be generated by an evaluation generator 54 is shown in FIGS. 15 A-E.

The payment history report screen is preferably read-only, although it may optionally be enhanced to permit members to sort the loan and/or lease records by different columns of information, such as the loan and/or lease start date, high credit value, current balance, payment amount, and number of remaining payments. If there is payment history data that is being disputed, it is flagged within the report. In addition, the customer's responses to a disputed loan and/or lease are displayed if the loan and/or lease at issue appears on the payment history report.

The system automatically stores information about each inquiry, including the account and member who made the inquiry, the time and date of the inquiry, the information provided, the report sections requested, whether the inquiry was successful, and if successful the customer and loan and/or lease records found. This information enables system administrators to look for patterns of inquiry abuse, examine how the system is being used, and determine what types of problems members are having when they make inquiries that do not result in matches. This information also enables the system to charge members for their use of the system (block 240).

Figure 16:
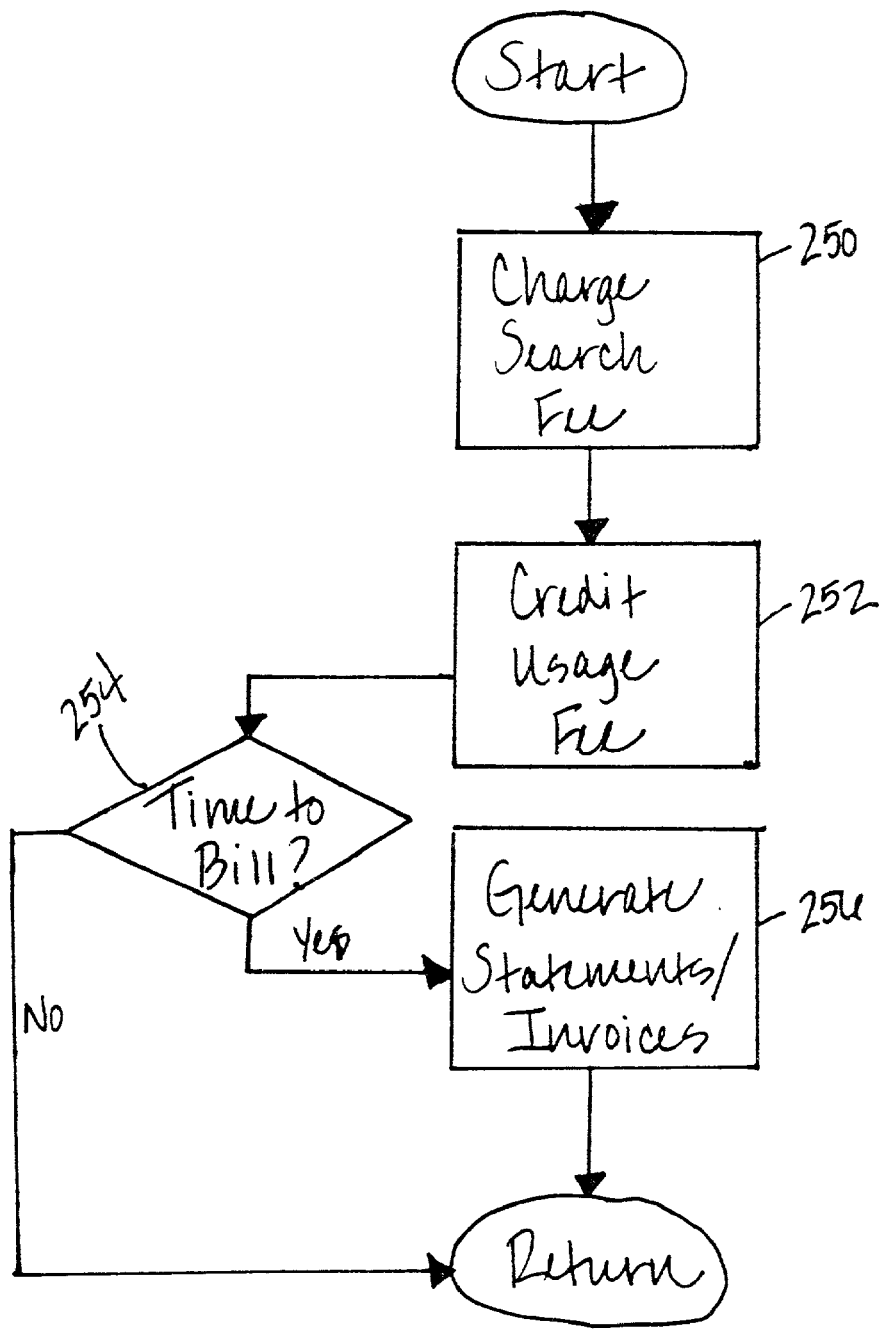
FIG. 16 is an illustration of exemplary software for implementing the accounting facility of FIG. 2.

In particular, whenever search results are displayed, the search engine 40 (FIG. 2) invokes the accounting facility 50. The accounting facility 50 can be implemented by software as shown in FIG. 16. When invoked by the search engine 40, the accounting facility 50 will charge a search fee to the user requesting the search (block 250) and, optionally, credit a usage fee to the user requesting the search (block 252). If it is time to actually bill the users (block 254), the accounting facility 50 will automatically issue invoices and/or statements to the appropriate users (block 256). As mentioned earlier, block 256 can optionally be performed by automatically debiting and/or crediting the bank account(s) or credit card account(s) of the appropriate users.

Preferably, blocks 254 and 256 are periodically called even when no searching is performed to ensure billing is performed on a predetermined cycle.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A method for automatically obtaining and exchanging credit information, wherein a computer program is installed on a member's computer for communicating with an accounting system of the member, the method comprising the steps of:

in response to a user command, obtaining payment history data from the member's accounting system at the member's computer using the installed computer program, including obtaining at least some of the payment history data in a proprietary format of the accounting system of the member, wherein the payment history data is associated with a plurality customers and is indicative of a quality of credit associated with the respective customers;

creating a payment history file at the member's computer that contains at least (i) the payment history data as a plurality of records, each of the plurality of records including a loan or a lease payment information for one of the plurality customers, (ii) an identifier of the member, and (iii) control records for validating the payment history file;

automatically formatting the payment history file into a predetermined format for storage in a system database using the installed computer program, including converting the at least some of the payment history data in the proprietary format into the predetermined format;

loading the payment history file through the Internet to the system database, including, at the system database:
opening the payment history file,
determining the payment history file type,
validating the format of the payment history file,
loading the payment history file into a system database,
performing a scrubbing routine on the payment history data to remove suspect payment history data, including modifying the suspect payment history data based upon thresholds set by the member, and
performing matching routines on the payment history data, wherein new lenders are created if no matching lender is found in the system database, and at least one of adding or updating payment history data in the system database is performed if a matching lender is found in the system database;

the method further comprising:
validating the payment history data in accordance with the control records included in the payment history file at the system database, including:
matching business information of each of the plurality of customers with information in a centralized data repository, wherein the business information includes at least one of customer name, customer address, phone number, and number of employees associated with the customer; and
comparing the obtained history data to a data record associated with each customer if the data record associated with the corresponding customer is present in the centralized data repository, including testing for at least one of a large time difference between records and presence of payments outside a maximum expected range;

evaluating the payment history data in the payment history file at the system database;

formatting the payment history file into a payment history report;

storing the payment history report in the centralized data repository associated with the system database; and automatically providing the payment history report to a requestor upon receiving a request corresponding to a specified one of the plurality of customers, including:

not disclosing an identity of the member that provided the payment data included in the payment history report; and generating a search fee for the requestor.

2. A method for automatically obtaining and exchanging credit information as defined in claim 1 further comprising the step of creating scoring and modeling of customer information.

3. A method for automatically obtaining and exchanging credit information as defined in claim 1, wherein providing the payment history report to the requestor upon receiving the request includes:

receiving search criteria for a customer;

searching the payment history data for a matching customer;

logging the search request;

displaying the matching customer data;

generating a payment history report for the matching customer; and displaying the payment history report.

4. A method for automatically obtaining and exchanging credit information as defined in claim 3, wherein the step of generating a payment history report for the matching customer further comprises the steps of:

computing summary and scoring information, including a high credit value, a total lease balance, total current payments, and a total number of times a customer had an overdue payment; and displaying the summary information.

5. A system comprising:

a member's computer having a computer-readable memory and a computer program installed thereon for communicating with the accounting system of the member, wherein the member's computer is configured to:

in response to a user command, obtain payment history data from the member's accounting system using the installed computer program, including obtaining at least some of the payment history data in a proprietary format of the accounting system of the member, wherein the payment history data is associated with a plurality customers and is indicative of a quality of credit associated with the respective customers;

create a payment history file at the member's computer that contains at least (i) the payment history data as a plurality of records, each of the plurality of records including a loan or a lease payment information for one of the plurality customers, (ii) an identifier of the member, and (iii) control records for validating the payment history file; and automatically formatting the payment history file into a predetermined format for storage in a system database using the installed computer program, including converting the at least some of the payment history data in the proprietary format into the predetermined format;

the system further comprising:

a credit information apparatus coupled to the member's computer via the Internet, wherein the credit information includes a system database and a centralized data repository associated with the system database; wherein the credit information apparatus is configured, in response to the member's computer loading the payment history file through the Internet to the system database to:

open the payment history file, determine the payment history file type, validate the format of the payment history file, load the payment history file into the system database, perform a scrubbing routine on the payment history data to remove suspect payment history data, including modifying the suspect payment history data based upon thresholds set by the member, perform matching routines on the payment history data, wherein new lenders are created if no matching lender is found in the system database, and at least one of adding or updating payment history data in the system database is performed if a matching lender is found in the system database;

validate the payment history data in accordance with the control records included in the payment history file, including:

match business information of each of the plurality of customers with information in a centralized data repository, wherein the business information includes at least one of customer name, customer address, phone number, and number of employees associated with the customer; and compare the obtained history data to a data record associated with each customer if the data record associated with the corresponding customer is present in the centralized data repository, including testing for at least one of a large time difference between records and presence of payments outside a maximum expected range;

evaluate the payment history data in the payment history file;

format the payment history file into a payment history report;

storing the payment history report in the centralized data repository; and automatically provide the payment history report to a requestor upon receiving a request corresponding to a specified one of the plurality of customers, including:

not disclose an identity of the member that provided the payment data included in the payment history report; and generate a search fee for the requestor.

* * * * *